United States Patent
Kline

(10) Patent No.: US 8,541,083 B2
(45) Date of Patent: Sep. 24, 2013

(54) WEBS

(75) Inventor: James R. Kline, Dayton, OH (US)

(73) Assignee: Avery Dennison Corporation, Pasadena, CA (US)

( * ) Notice: Subject to any disclaimer, the term of this patent is extended or adjusted under 35 U.S.C. 154(b) by 110 days.

(21) Appl. No.: 12/910,117

(22) Filed: Oct. 22, 2010

(65) Prior Publication Data

US 2011/0031321 A1    Feb. 10, 2011

Related U.S. Application Data

(60) Division of application No. 11/259,681, filed on Oct. 26, 2005, now Pat. No. 7,842,156, which is a continuation-in-part of application No. 11/116,014, filed on Apr. 27, 2005, now Pat. No. 7,749,350.

(51) Int. Cl.
*B32B 9/00* (2006.01)
*B32B 33/00* (2006.01)

(52) U.S. Cl.
USPC ...................... 428/40.1; 428/195.1

(58) Field of Classification Search
USPC ............... 428/40.1, 40.9, 41.1, 41.9, 195.1, 428/198, 343, 344; 343/793, 795, 806; 29/846, 29/592.1; 340/568.1, 571, 572.1
See application file for complete search history.

(56) References Cited

U.S. PATENT DOCUMENTS

| | | | |
|---|---|---|---|
| 4,717,438 A | 1/1988 | Benge et al. | |
| 4,910,499 A | 3/1990 | Benge et al. | |
| 5,084,345 A | 1/1992 | Manos | |
| 6,146,485 A | 11/2000 | Iacono et al. | |
| 6,333,073 B1 | 12/2001 | Nelson et al. | |
| 6,404,643 B1 | 6/2002 | Chung | |
| 6,456,228 B1 | 9/2002 | Granhed et al. | |
| 7,158,037 B2 | 1/2007 | Forster et al. | |
| 7,250,868 B2 | 7/2007 | Kurz et al. | |
| 2002/0195195 A1 | 12/2002 | Grabau et al. | |
| 2003/0100654 A1* | 5/2003 | Chheang et al. | 524/445 |
| 2003/0136503 A1* | 7/2003 | Green et al. | 156/264 |
| 2004/0041262 A1 | 3/2004 | Okamoto et al. | |
| 2004/0215350 A1 | 10/2004 | Roesner | |
| 2005/0085010 A1 | 4/2005 | Tsunoda et al. | |
| 2005/0108912 A1* | 5/2005 | Bekker | 40/633 |
| 2005/0184873 A1 | 8/2005 | Eckstein et al. | |
| 2006/0063323 A1 | 3/2006 | Munn | |
| 2006/0117554 A1* | 6/2006 | Herrmann et al. | 29/601 |

FOREIGN PATENT DOCUMENTS

| | | |
|---|---|---|
| DE | 10120269 | 7/2002 |
| WO | WO/01/76949 | 10/2001 |
| WO | WO/02/082368 | 10/2002 |
| WO | WO/03/012734 | 2/2003 |
| WO | WO/03/092174 | 11/2003 |

\* cited by examiner

*Primary Examiner* — Patricia Nordmeyer
(74) *Attorney, Agent, or Firm* — Avery Dennison Corporation

(57) ABSTRACT

There are disclosed methods of making RFID transponder webs and intermediate webs such as RFID strap webs and antenna webs, as well as such webs per se.

8 Claims, 17 Drawing Sheets

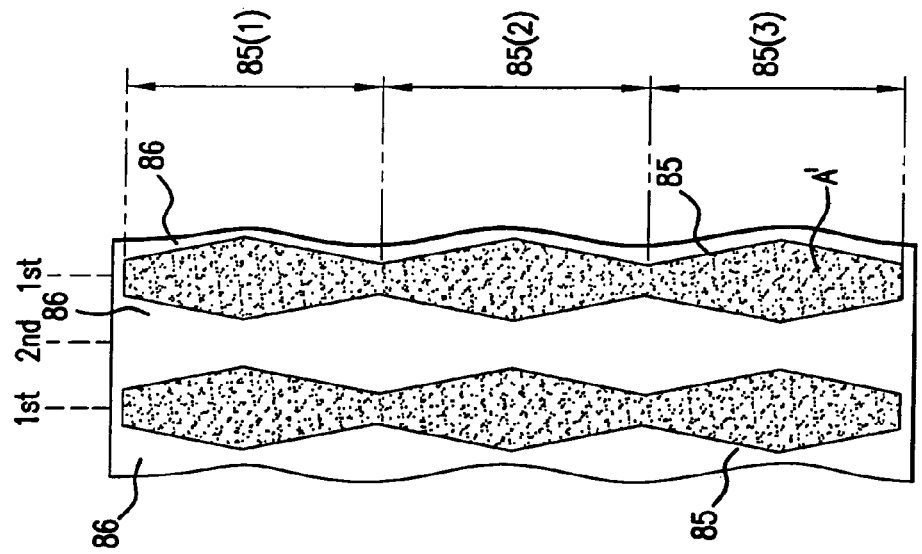
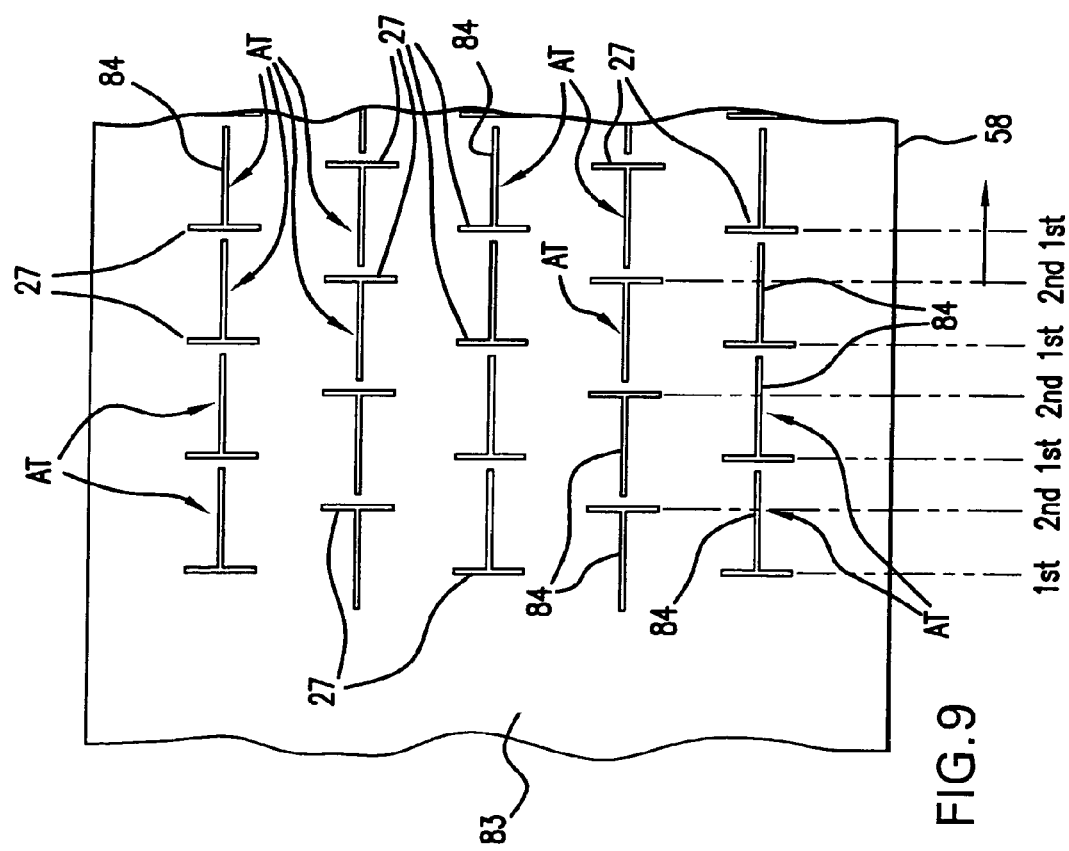
FIG. 10
FIG. 9

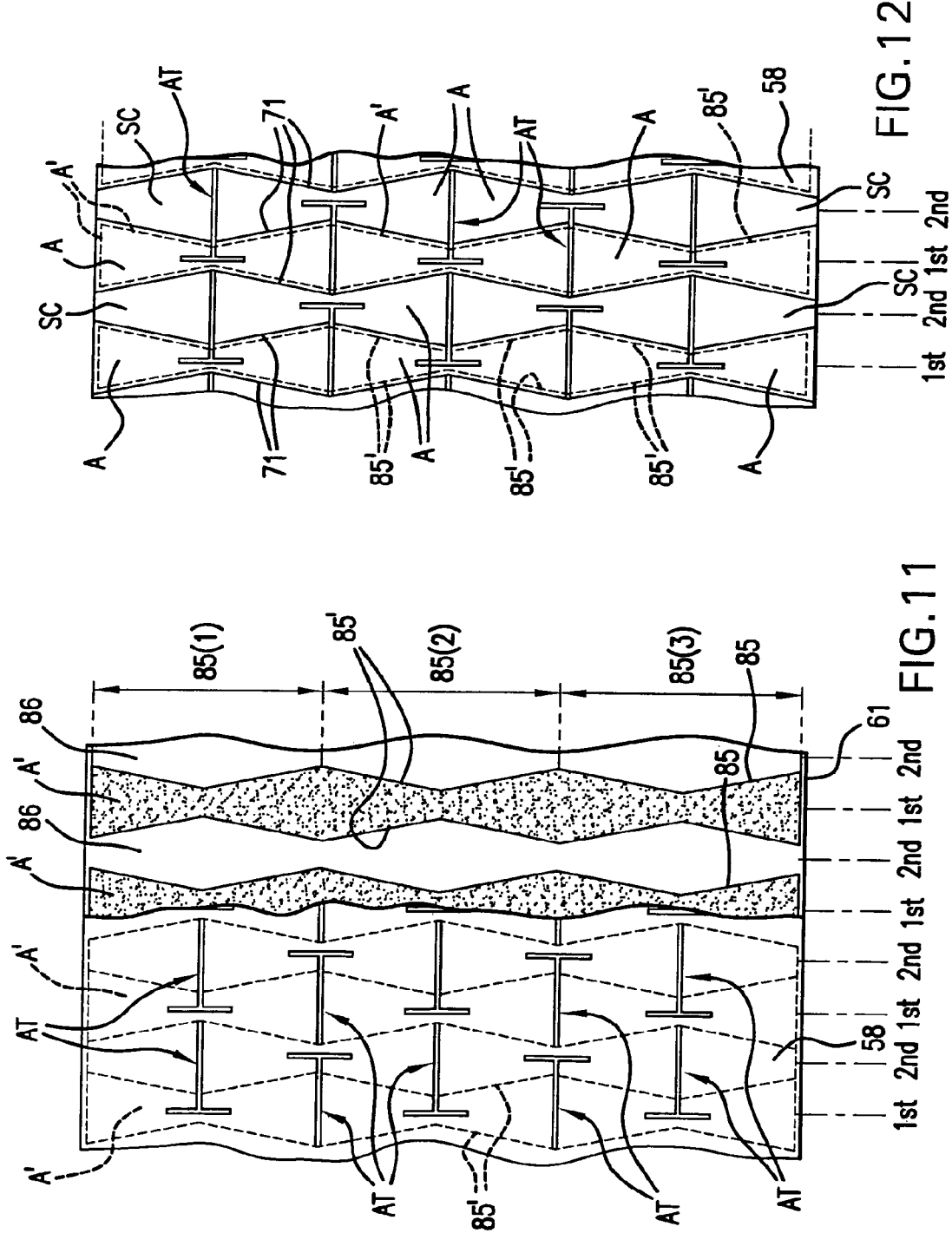

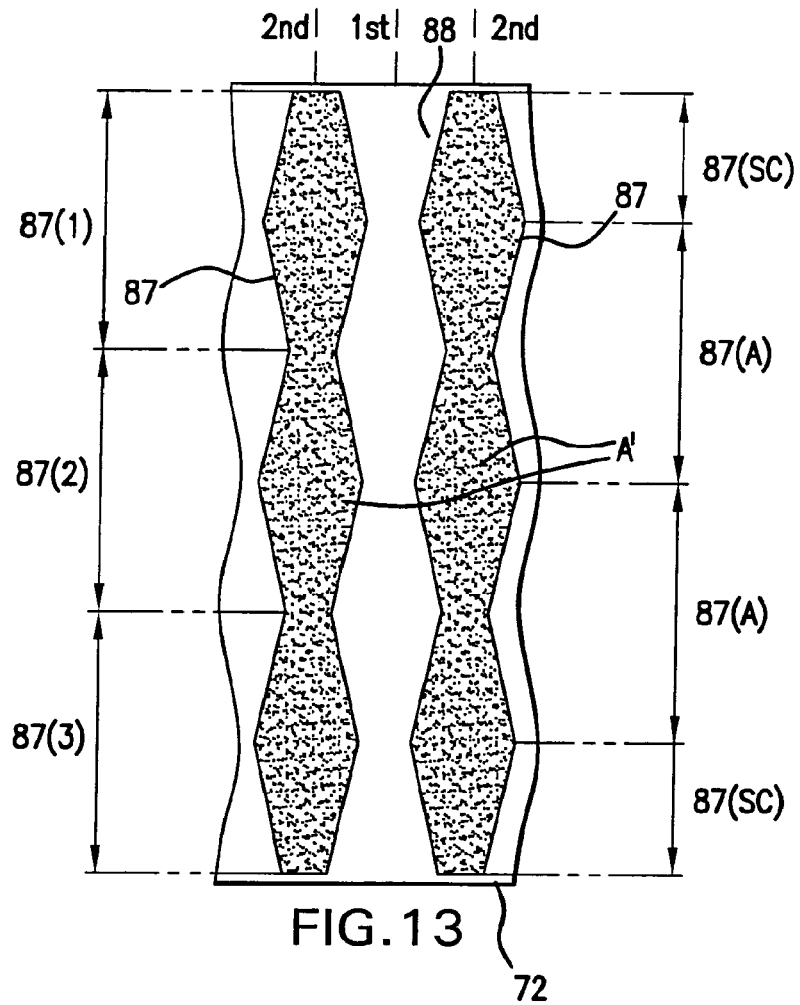
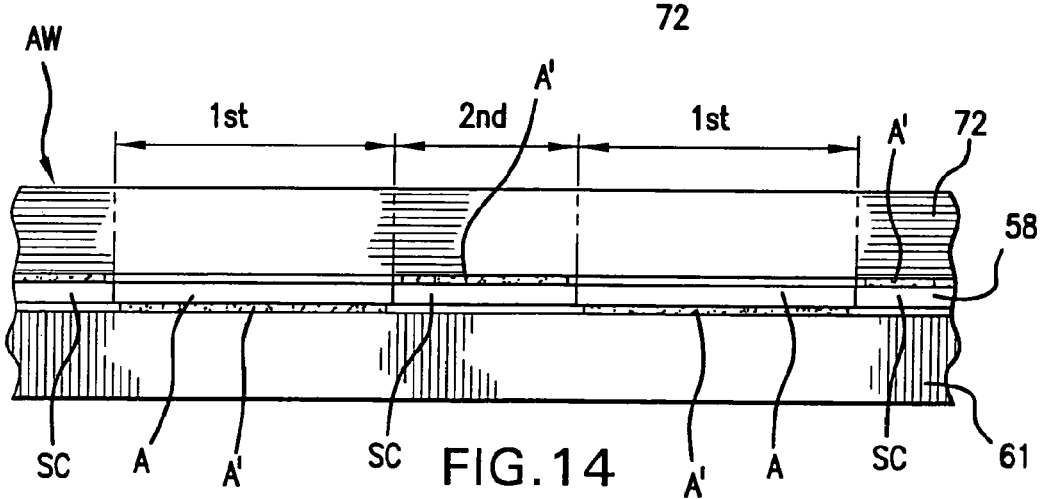

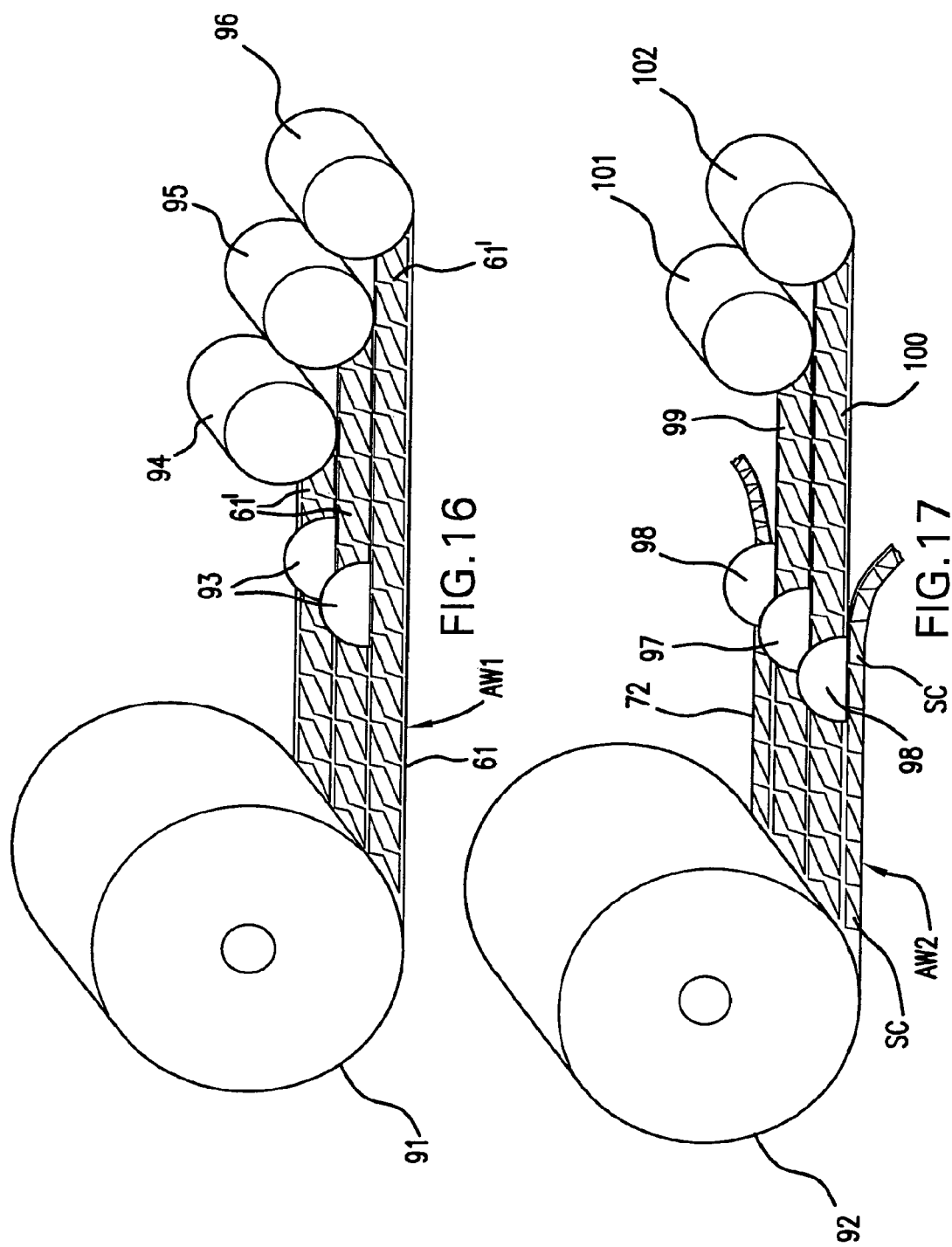

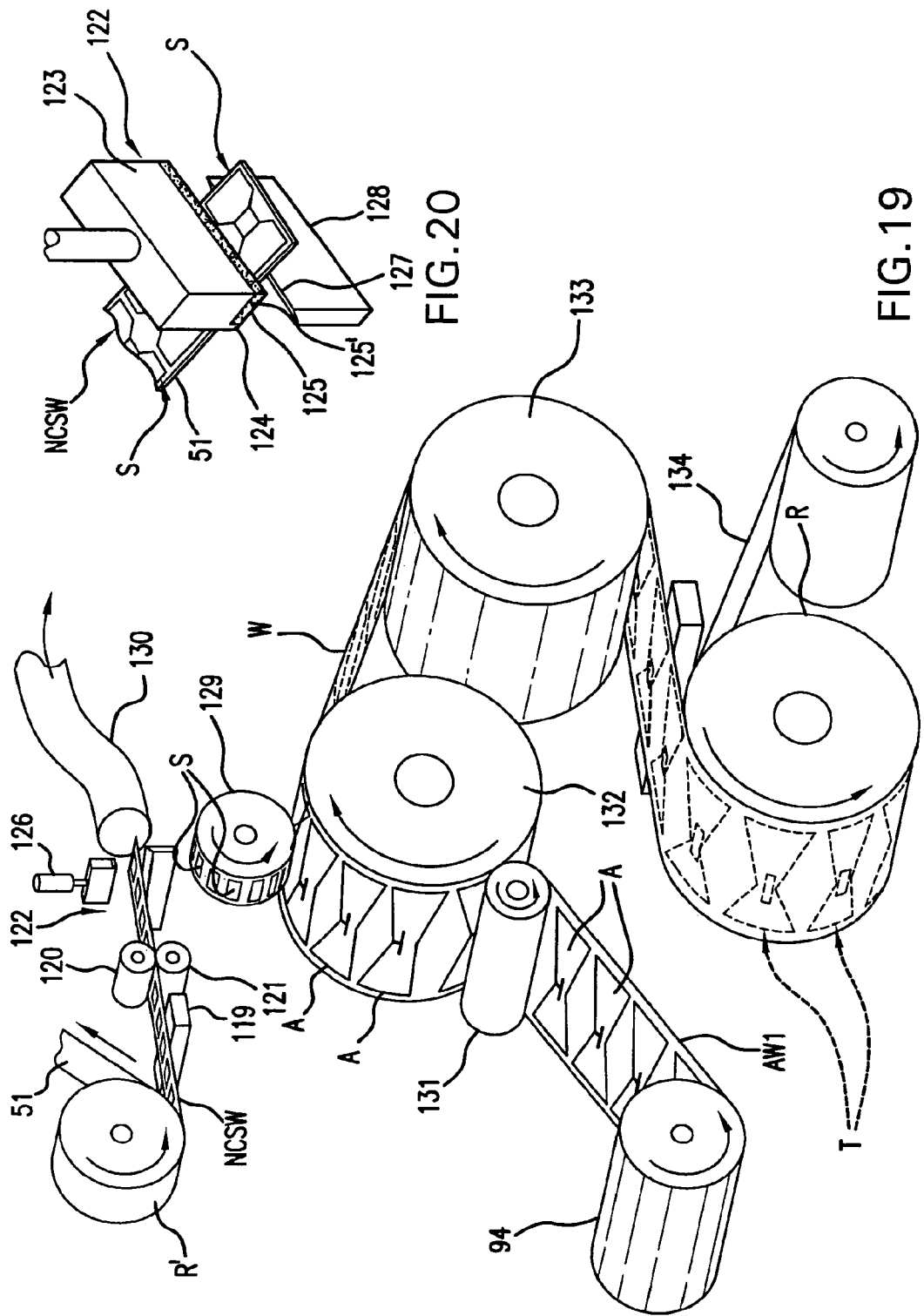

WEBS

CROSS-REFERENCE TO RELATED APPLICATION

The present application is a division of U.S. patent application Ser. No. 11/259,681 filed Oct. 26, 2005, which is a continuation-in-part of U.S. application Ser. No. 11/116,014 filed Apr. 27, 2005, now U.S. Pat. No. 7,749,350, both of which are incorporated herein by reference in their entireties.

FIELD OF THE INVENTION

This invention relates to methods of making webs including antenna webs and RFID transponder webs and to RFID antenna webs.

BRIEF DESCRIPTION OF THE PRIOR ART

The following prior art is made of record: U.S. Pat. No. 4,910,499 and published U.S. Patent Application 2004/0215350A1.

In the field of radio frequency identification (RFID) to which this invention relates, an RFID chip is connected to an antenna to form a transponder into which data can be written and from which data can be read. It is known to make labels, tags, business forms, packaging and the like which incorporate such transponders. The chips are very small and require connection to antennas. To facilitate this connection, straps including chips are connected to the antennas. A strap includes an RFID chip and a pair of strap contacts or connecting elements used to connect the chip to an antenna. It is common to provide the straps in a wide web, wherein the straps are arranged close to each other in parallel columns and transversely extending rows. These wide strap webs have some residual adhesive on their electrically conductive side resulting from the manufacturing process and accordingly these wide strap webs are co-wound with an adhesive. The straps have a high density along and across the web. In order to use the narrow webs of straps, the straps must eventually be separated as by cutting them from the narrow strap web prior to connection to antennas. Alternately, an electrically conductive tape can be co-wound with the strap web.

It is known to use an electrically conductive thermoset adhesive film to interconnect flexible circuits to printed circuit boards or other flexible circuits. Conductive particles loaded into the adhesive allow interconnection through the adhesive thickness but are spaced far enough apart to be electrically insulating in the plane of the adhesive.

SUMMARY OF THE INVENTION

The invention relates to improved methods of making RFID transponder webs and intermediate webs such as patterned adhesive webs and antenna webs.

The invention relates to the methods of making webs of antennas. One embodiment of the method involves providing a composite antenna web having a first carrier web and a second carrier web between which are transverse rows of first and second antennas, wherein the first antennas are adhesively adhered to the first carrier web and the second antennas are adhesively adhered to the second carrier web, delaminating the first and second carrier webs from each other to provide first and second antenna webs, and thereafter slitting the first wide antenna web into narrow first antenna webs each having a single column of first antennas and slitting the second wide antenna web into narrow second antenna webs each having a single column of second antennas.

It is preferred to form the antennas by providing a web of a flexible electrically conductive metal, forming slots in the metal web along longitudinally extending columns and lateral rows, and cutting the metal web generally transversely into rows of side-by-side antennas.

According to an improved method of making antenna webs, there is provided a composite antenna web having a first carrier web and a second carrier web between which are transverse rows of alternate first and second antennas, the first antennas being adhesively adhered to the first carrier web and the second antennas being adhesively adhered to the second carrier web, separating the first and second carrier webs from each other to provide first and second antenna webs, and thereafter slitting the first antenna web into narrow first antenna webs each having a single column of antennas and slitting the second antenna web into narrow second antenna webs each having a single column of antennas.

As an intermediate to the making of antenna webs, a longitudinally extending carrier web is provided, and applying a patterned adhesive coating to the carrier web in transversely extending rows or lines corresponding in shape generally similar to rows of first antennas spaced by non-adhesive or non-tacky areas corresponding in shape generally similar to rows of transversely offset second antennas and scrap.

As an intermediate to the making of antenna webs, a longitudinally extending carrier web is provided, and applying a patterned adhesive coating to the carrier web in transversely extending rows or lines in a shape generally similar to rows of second antennas and scrap spaced by non-adhesive or non-tacky areas corresponding in shape generally similar to rows of transversely offset first antennas.

The invention includes a method of making a transponder web which includes providing a web of antennas, passing the antenna web partially around a heated first drum, providing a web of RFID straps, separating the straps one-by-one from the strap web, applying the straps one-by-one to a heated, vacuum, second drum, moving the heated drums to bring the straps and the antenna web together to connect the straps to the antennas to provide a web of RFID transponders.

The invention also relates to an antenna web including a flexible web of electrically conductive metal, slots in the metal web along longitudinally extending columns and lateral rows, and the metal web being cut generally transversely into slotted antennas.

The invention also relates to an antenna web including a flexible, electrically conductive metal web cut into longitudinally extending columns with alternate end-to-end first and second rows of side-by-side first antennas and side-by-side second antennas, a first film adhered to the first antennas of the first rows, and a second film adhesively adhered to the second antennas of the second rows.

The invention also relates to a web including a longitudinally extending carrier web, a patterned adhesive coating on the carrier web having longitudinally spaced adhesive areas with non-linear or cascading or variable transversely extending edges in transversely extending rows longitudinally spaced apart by rows of non-adhesive or non-tacky areas, and wherein the adhesive areas and the non-adhesive or non-tacky areas are similar in shape but are laterally offset with respect to each other.

In a specific embodiment, a composite RFID strap web includes a wide web of RFID straps in longitudinally extending columns and transversely extending rows, and a conductive adhesive web comprising a flexible carrier web, a release coating on one side of the carrier web, a thermoplastic conductive adhesive web releasably adhered to the release coating, the adhesive being adhered to all the straps in the wide strap web, and the adhesive coating containing electrically conductive particles. The resultant composite wide strap web can be slit into narrow strap webs. A specific embodiment of a method of making narrow composite RFID strap webs includes providing a wide web of RFID straps in longitudinally extending columns along the wide web and in transversely extending rows across the wide web, providing a wide web of thermoplastic adhesive containing electrically conductive particles, adhering the wide web of adhesive to the wide strap web to provide a wide composite strap web by heating the adhesive sufficiently to adhere the adhesive to the wide strap web, and slitting the wide composite strap web longitudinally into narrow composite strap webs. Straps bearing the adhesive can be cut from a narrow strap web and the method includes electrically connecting the straps to antennas to provide transponders. The adhesive can comprise a heat seal adhesive. The strap and the antenna are positioned for attachment under pressure and the adhesive on the strap is heated at a sufficient temperature to connect the strap to the antenna.

BRIEF DESCRIPTION OF THE DIAGRAMMATIC DRAWINGS

FIG. 9 is a top plan view taken generally along line 9-9 of FIG. 8 showing slots or cutouts that have been cut into a web of a flexible, electrically conductive metal;

FIG. 10 is a top plan of a first carrier web taken generally along line 10-10 of FIG. 8 showing a pattern of an adhesive coating on a first carrier web in accordance with the invention;

FIG. 11 is a fragmentary top plan view taken generally along line 11-11 of FIG. 8 showing the slotted metal web and the underlying carrier web with its patterned adhesive;

FIG. 12 is a fragmentary top plan view taken generally along line 12-12 of FIG. 8 showing the slotted metal web having been cut into rows of first and second antennas;

FIG. 13 is a top plan view of a second carrier web taken generally along line 13-13 of FIG. 8 showing a pattern of an adhesive coating on a second carrier web in accordance with the invention;

FIG. 14 is a fragmentary side elevational view of a composite antenna web taken along line 14-14 of FIG. 8;

FIG. 16 is a perspective view of the first wide antenna web being slit into narrow antenna webs;

FIG. 17 is a perspective view of the second wide antenna web being slit into narrow antenna webs and trimmed of waste or scrap;

FIG. 19 is a perspective view depicting a method of making an RFID transponder web from webs of RFID straps and antennas;

FIG. 20 is an enlarged, fragmentary, perspective view of a cutter and an applicator also shown in FIG. 19;

DETAILED DESCRIPTION OF THE PREFERRED EMBODIMENTS

Figure 1:
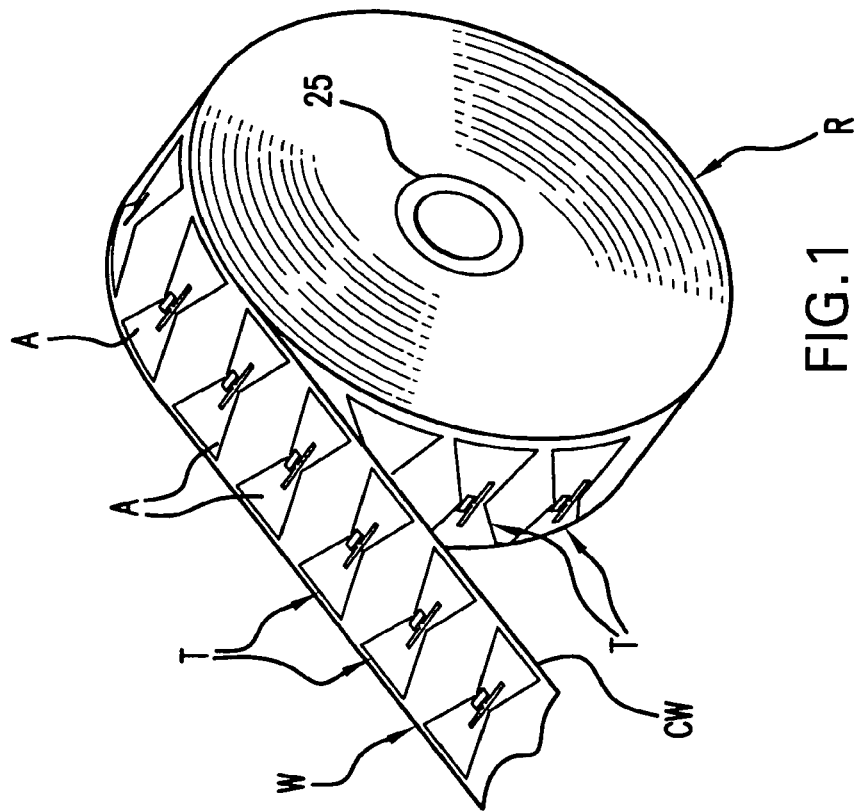
FIG. 1 is a perspective view of a web of RFID transponders in roll form made in accordance with methods of the invention.

With reference to FIG. 1, there is shown a roll R of a web W of radio frequency identification (RFID) transponders T. The web W includes a carrier web CW on which the transponders T are carried. The roll R typically has a core 25 or a coreless central opening by which the roll R can be mounted for rotation.

Figure 2:
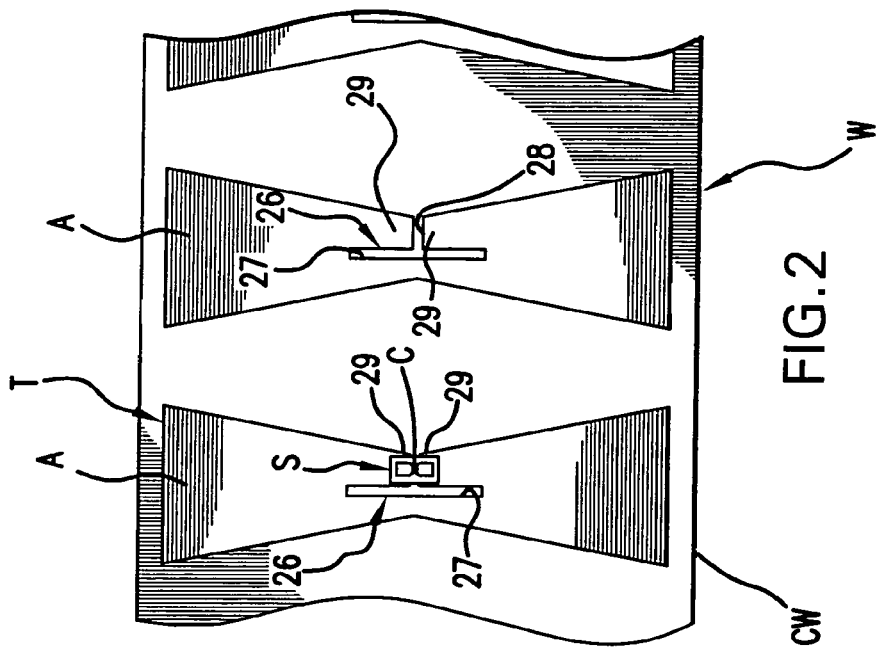
FIG. 2 is an enlarged, fragmentary, top plan view of the transponder web.

With reference to FIG. 2, one RFID transponder T on the left side of FIG. 2 is shown in greater detail. Each transponder T is comprised of an antenna A and a strap S having an RFID chip C. No strap S is shown on the antenna A on the right side of FIG. 2 for clarity. The antennas A are generally bow-tie shaped, but they can have other shapes. The antenna A has a slot 26 shown to have a generally T-shaped configuration. The top or horizontal part 27 of the slot 26 and a stem or vertical part 28 of the slot 26 define a pair of contacts or attachment elements 29 to which a strap S can be attached.

Figure 3:
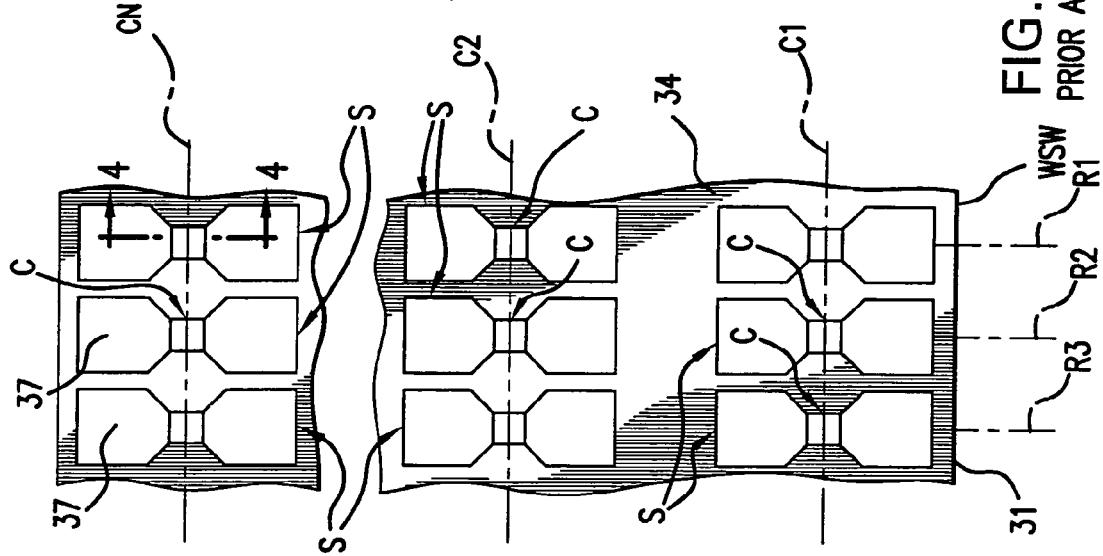
FIG. 3 is a fragmentary top plan view of a wide RFID strap web.

FIG. 3 illustrates a wide strap web WSW of RFID straps S on a carrier web 31 comprised of flexible plastics film. The web 31 is common to all the straps S. The straps S are arranged in columns C1 through CN and rows R1, R2, R3 and so forth. Commercially available strap webs WSW as depicted in FIG. 3 can be purchased with multiple columns of straps S across the strap web.

Figure 4:
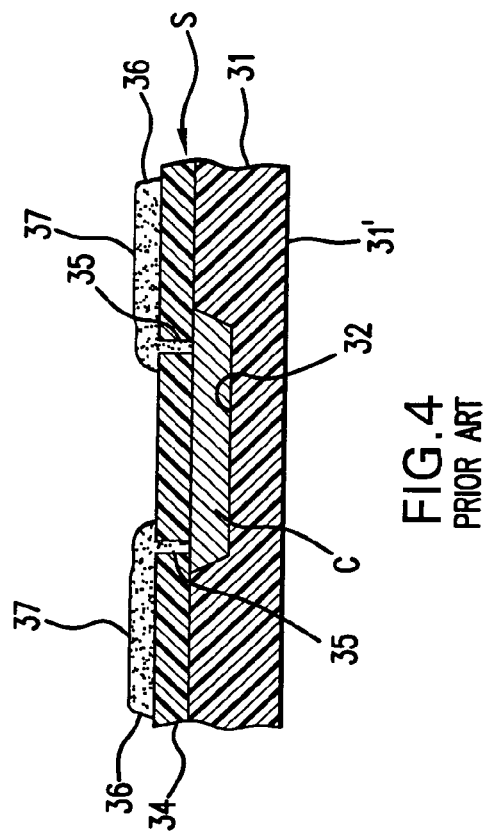
FIG. 4 is a fragmentary sectional view taken generally along line 4-4 of FIG. 3.

FIG. 4 shows the construction of one form of strap S. The strap S has a non-electrically conductive plastics film or carrier 31 with a recess 32 for receiving an RFID chip C as shown. Covering the film 31 is a non-electrically conductive plastics film 34 having a pair of holes 35 for each strap S. A suitable conductor such as electrically conductive silver printing 36 is applied over the film 34 and the silver printing 36 passes into the holes 35 in contact with connections on the chip C. Following application of the printing 36, the printing 36 hardens. The printing 36 is large enough in area so it can easily form contacts or contact elements 37. The upper surface of the contacts 37 as shown in FIG. 4 is the electrically conductive side of the strap S and the lower surface 31' of the non-conductive film 31 is the non-electrically conductive side of the strap S. The straps S have their contacts 37 facing upwardly as viewed in FIGS. 3 and 4.

Figure 5:
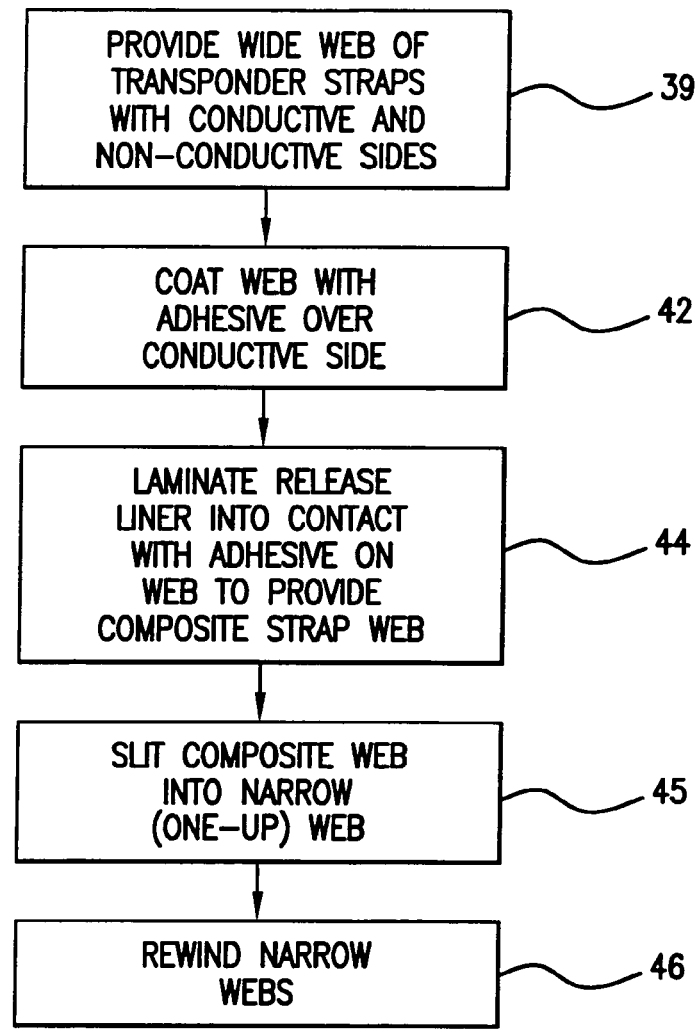
FIG. 5 is a flow chart depicting the making of a narrow, one column wide, composite RFID strap web from a wide RFID strap web having columns and rows of RFID straps.

It is inconvenient to attempt to apply straps S to antennas A while the straps S are in a wide web having columns of straps S. With reference to FIG. 5, it is preferred to start with a commercially available roll of a wide web of straps having columns and rows of closely spaced straps each with an electrically conductive side as seen at block 39. The wide strap web WSW is unwound from a roll and the conductive side of the straps is exposed. Next, the wide strap web WSW is provided with a coating over the transponder straps S with a material which not only has adhesive properties and is therefore referred to as an adhesive 40 shown in FIGS. 6 and 7, and this adhesive 40 also contains electrically conductive metal particles 41 shown by stippling in FIGS. 6 and 7. The adhesive 40 may or may not be tacky. For clarity, the straps S are shown in solid lines in FIGS. 6 and 7 even though the straps S are beneath the adhesive 40. Although it is possible to selectively coat only contacts 37 of the straps S using a patterned adhesive, it is preferred to coat the entire strap web WSW with the conductive particle-containing adhesive 40. The adhesive 40 is preferably an anisotropic adhesive. The coating of the strap web WSW is shown at block 42 in FIGS. 6 and 7. Next, if the adhesive 40 is tacky, a release liner 43 (FIGS. 6 and 7) having a release coating such as silicone is laminated into contact with the adhesive 40. The adhesive 40 is against and between the release-coated side of the liner 43 and the conductive side of the contacts 37 to provide a wide composite strap web CSW as depicted in block 44. Next, as shown at block 45 the wide web CSW is slit into narrow composite strap webs NCSW. Thereafter, the narrow composite strap webs NCSW are wound into rolls as indicated at block 46 for future use in making transponders.

Figures 6, 7:
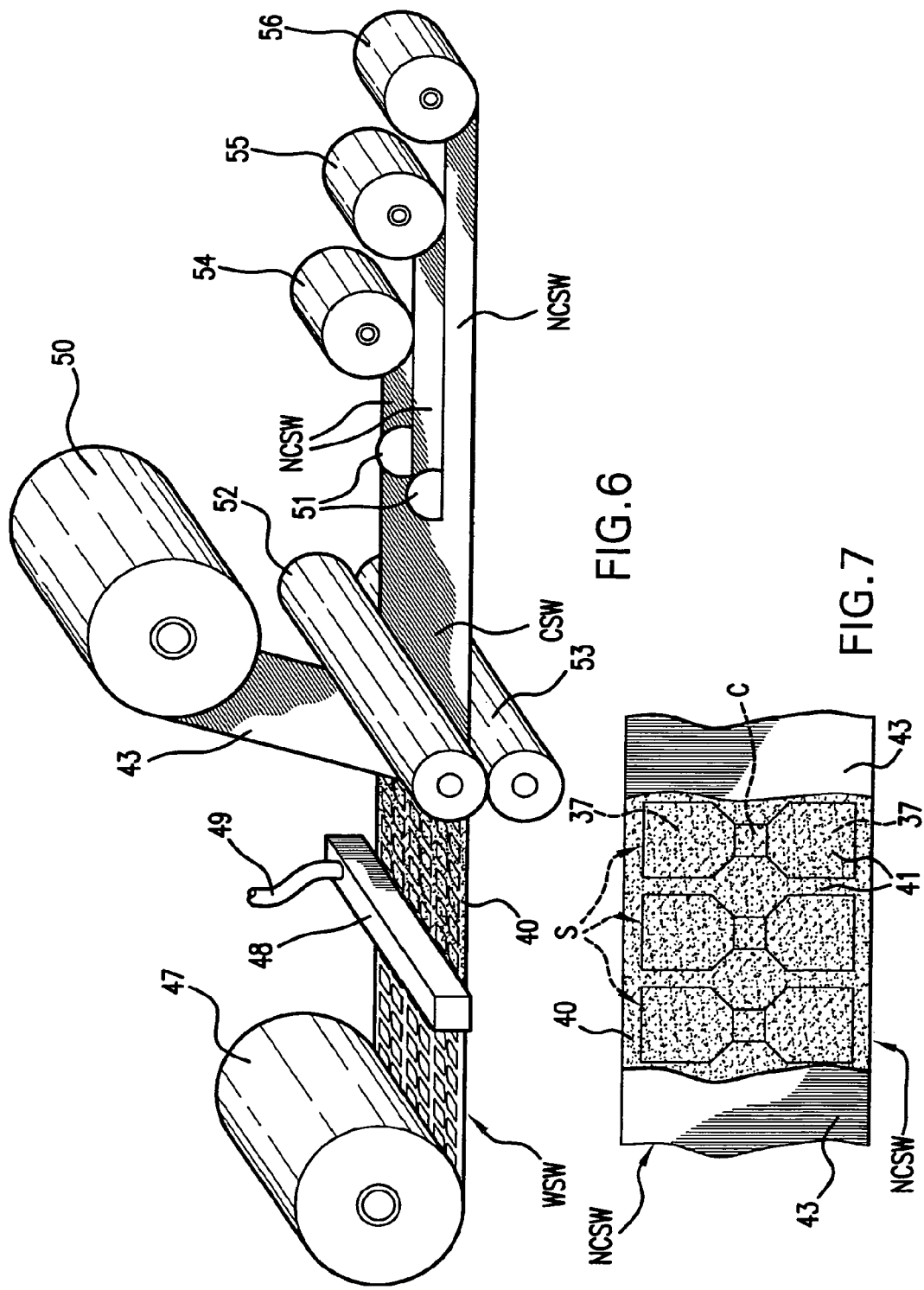
FIG. 6 is a perspective view showing the conversion of a wide web of RFID straps into a plurality of narrow composite webs of RFID straps.
FIG. 7 is a top plan view of one of the webs of narrow (one-up) composite RFID straps shown in FIG. 6.

FIG. 6 shows the wide strap web WSW as being unwound from a roll 47 and moved into cooperation with an adhesive coating head 48 supplied with a heat seal adhesive through a conduit 49. The coating head 48 preferably applies a uniform continuous coating or layer of the conductive particle-containing adhesive 40 to the surface of the strap web WSW. In that the conductive side of the contacts 37 face upwardly as viewed in FIG. 6, the adhesive 40 and the particles 41 it contains are in direct contact with the contacts 37. A roll 50 of release liner 43 with its silicone-coated side on the outside of the roll 50, is passed partially around a laminating roll 52 to effect lamination of the coated strap web WSW. The resulting composite strap web CSW passes between rolls 52 and 53. Downstream of the rolls 52 and 53, the composite strap web CSW is slit into a plurality of narrow composite strap webs NCSW having a single column of straps S (or one-up) by knives 51, and rewound into rolls 54, 55 and 56. Although only three-wide rows of transponder straps S are illustrated, strap webs having any desired number of straps per row can be provided, coated, slit and rewound.

FIG. 7 shows a narrow composite strap web NCSW with its liner 43 broken away to show the straps S coated with the adhesive 40 containing conductive particles 41.

Figure 8:
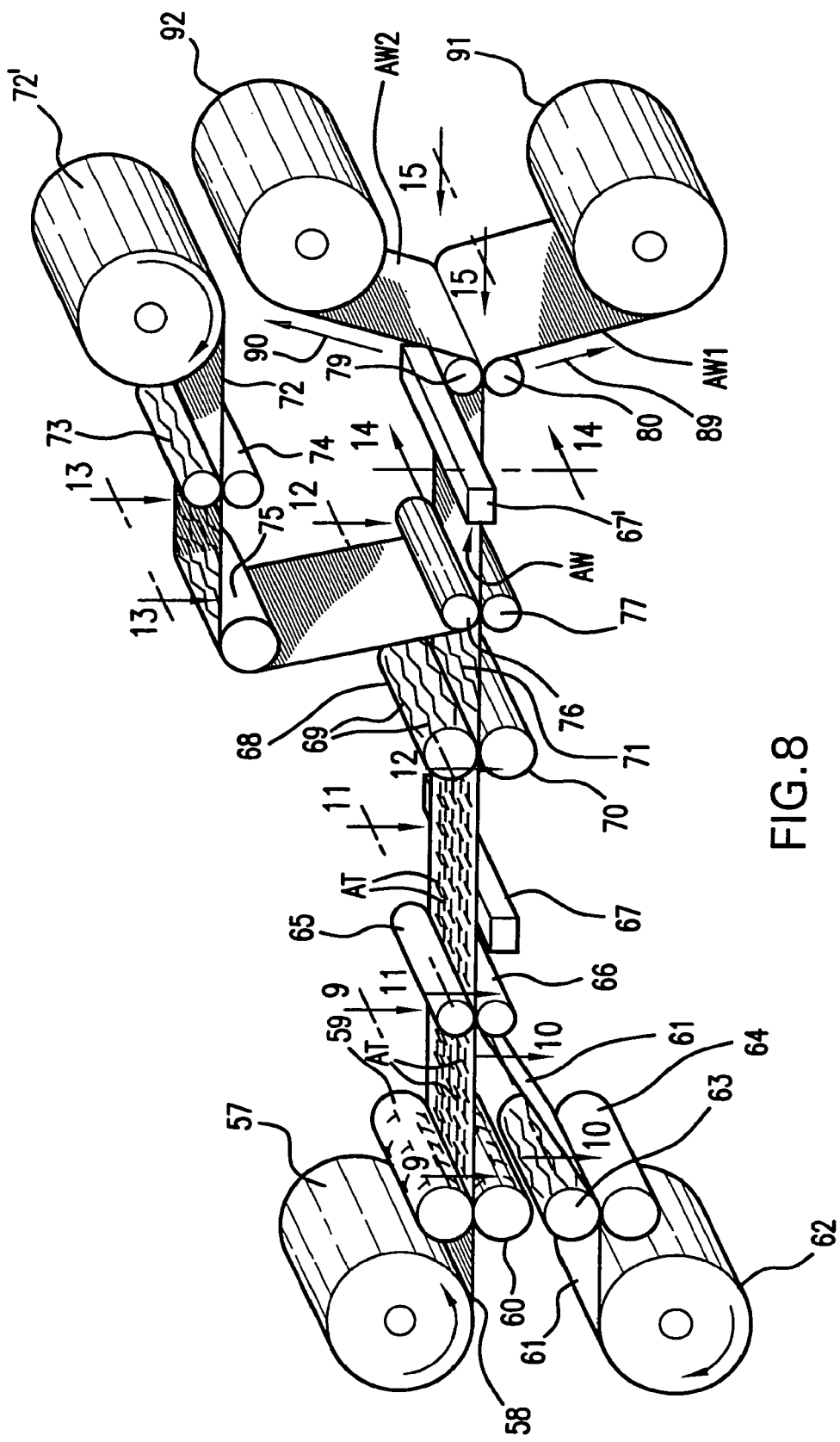
FIG. 8 is a perspective view showing a method of making webs of antennas for use in making RFID transponders.

With reference to FIG. 8, there is illustrated a method of making antenna webs. The starting material is a roll 57 of a flexible electrically conductive metal web 58 which is unwound and passed to between a punch roll 59 and a die roll 60. The web 58 is preferably comprised of aluminum. The punch roll 59 and die roll 60 cooperate to punch out slots AT from the metal web 58 in a pattern best shown in FIGS. 9, 11 and 12. The roll 60 can be a vacuum roll by which metal chads (not shown) resulting from the punch out operation can be removed. Simultaneously with movement of the web 58 to the punch roll 59 and the cooperating die roll 60, a web 61 of a flexible transparent plastic material is paid out of a roll 62 and passed between a patterned roll 63 and a back-up roll 64. The web 58 is referred to for convenience as a "first web". The pattered roll 63 coats or prints a pattern of an ultraviolet (UV) curable adhesive A' (FIG. 11) onto the upper surface of the web 61 according to a pattern illustrated in greater detail in FIG. 10. The conductive web 58 which has been slotted and the web 61 are laminated together as they pass between rolls 65 and 66. Thus, the lamination occurs downstream of the place the slots AT are made in the web 58. The combined webs 58 and 61 are shown in greater detail in FIG. 11. From there, these combined webs 58 and 61 pass over an ultraviolet (UV) light source 67 which cures the UV-curable adhesive A' on the web 61 applied by the roll 63. Once cured, the adhesive A' is dry and non-tacky. Next the combined webs with the cured adhesive A' holding them together pass between a cutter roll 68 having cutting blades 69 and a plain back-up roll 70. The cutter blades 69 cut the web 58 transversely along cascading non-linear lines or cuts 71 as best shown in FIG. 12 without cutting into the web 61. It is readily apparent that the slots AT and the cuts 71 together separate the web 58 into rows of side-by-side and end-to-end antennas A. As the combined webs 58 and 61 travel, a film or web 72 of flexible transparent plastics material is unwound from a supply roll 72' and is passed between a pair of rolls 73 and 74. The roll 73 is a patterned roll that coats or prints adhesive A' in a pattern best shown in FIG. 13 to the upper side of the web 72. The web 72 is then passed partially around a roll 75 and from there partially around a roll 76. Combined webs 58, 61 and 72 referred to as AW pass between the roll 76 and a back up roll 77 and from there they pass beneath an ultraviolet (UV) light source 67'. The webs 61 and 72 being transparent or sufficiently so that the UV light can readily cure the adhesive A'.

FIG. 14 is a side view of the sandwich or composite web AW comprised of the patterned adhesive-coated webs 61 and 72 and the intervening slotted and cut conductive metal web 58.

From there, the combined webs 58, 61 and 72 pass beneath an ultraviolet light source 78 which cures the adhesive A' on the web 72. From there, the combined webs 58, 61 and 72 pass between a pair of rolls 79 and 80, and from there the webs 61 and 72 pass in the directions of arrows 89 and 90 and are wound into rolls 91 and 92.

With reference to FIG. 9, the left-hand portion 83 of the conductive web 58 shows the unslotted web as it comes off the roll 57. When the web 58 passes between the punch roll 59 and the die roll 60 the slots AT are formed in the web 58. The slots AT extend in laterally spaced columns in patterns that alternate from column-to-column. The slots AT of the outer columns and the slots AT of every other column between the outer columns extend in the same direction. Intervening or alternate columns of slots AT extend in the opposite direction. The metal chads (not shown) removed by the punch roll 59 and the die roll 60 are T-shaped and, therefore, all of the conductive material within the periphery of each slot AT is removed. Each slot AT is comprised of the horizontal cut out 27 (FIG. 2) and a long vertical cut out 84. Together the slot portions 27 and 84 form the slots AT depicted in FIG. 9.

FIG. 10 depicts the pattered adhesive A' applied by the roll 63 (FIG. 8) to the first web 61. The two rows of zones or areas 85 of adhesive A' are shown to be identical in shape. The non-adhesive or non-tacky zones or areas 86 between the adhesive areas 85 are similar but not identical in size and shape to the areas 85 as will be seen and described with reference to FIG. 12. The areas 86 are laterally offset from the areas 85 as is also seen in FIGS. 11 and 12.

FIG. 11 shows the relationship of the slots AT through the conductive web 58 to the adhesive A' on the web 61. The left side of FIG. 11 shows the adhesive A' by broken lines because the adhesive on that side of FIG. 11 is beneath the conductive web 58.

FIG. 12 shows that the adhesive A' has non-linear edges 85' spaced inwardly from the non-linear lateral edges 71 of the antennas A, as is preferred. It is to be noted that the slots AT and the cuts 71 define antennas A and waste or scrap SC. In the illustrated composite antenna web of FIG. 12, first rows 1st have three antennas A and second rows 2nd have two antennas A and scrap SC. Even though the wide web shown in FIG. 12 is only three antennas wide in rows 1st, the scrap amounts to only a small portion of the overall web, the greater the number of antennas across the web the less the percentage of scrap SC to the overall amount of metal material in the web 58. It is noted that the number of antennas A in the first rows 1st is greater than the number of antennas A in the second rows 2nd. Generally, the numbers of first antennas A will exceed the number of second antennas A by one, thus first row 1st is shown to have three antennas A and second row 2nd is shown to have two antennas A.

FIG. 13 shows the pattern of adhesive A' in the web 72 for registration with the second antennas A of the conductive web 58. Adhesive zones 87 (FIG. 13) are identical to adhesive zones 85 (FIG. 11), and non-adhesive or non-tacky zones 88 (FIG. 13) are identical to non-adhesive or non-tacky zones 86 (FIG. 11).

With reference to FIGS. 10, 11 and 13, it is apparent that the areas 85 and 87 of adhesive A' have the same size and shape. The areas 85 and 87 are continuous as is preferred, yet they are referred to as "rows". There are shown three antennas A over each area 85. Similarly, there are shown two antennas A and two pieces of scrap SC under each area 87. So even though the areas 85 and 87 are considered rows, each row 85 corresponds to three antennas A, and each row 87 corresponds to two antennas A and two pieces of scrap SC. Each adhesive area 85 is considered to include adhesive area sections 85(1), 85(2) and 85(3), shown to be identical to each other, and each area section 85(1), 85(2) and 85(3) corresponds to and underlies an antenna A and adhesively secures the web 61 to one of the antennas A in row $1^{st}$. Each adhesive area 87 includes adhesive sections 87(1), 87(2) and 87(3) shown to be identical to each other and identical in size and shape to adhesive sections 85(1), 85(2) and 85(3). However, the sections 85(1), 85(2) and 85(3) are in row $1^{st}$, and the sections 87(1), 87(2) and 87(3) are in row $2^{nd}$. The rows $2^{nd}$ of adhesive A' can also be considered to have adhesive sections 87(A) which have generally the shape as the antennas A and areas 87(SC) which have generally the shape as the scrap SC. The adhesive sections 87(A) adhesively secure the antennas A in row $2^{nd}$ to the web 72 and the adhesive sections 87(SC) adhesively secure the scrap SC in row $2^{nd}$ to the web 72. Thus, although the adhesive areas 85 and 87 have the same appearance, the adhesive sections 87(1), 87(2) and 87(3) on the web 61 are laterally offset or staggered with respect to adhesive sections 87(A). By having the antennas A in row $1^{st}$ offset or staggered from the antennas A in row $2^{nd}$ there is no waste of the metal web 58 between antennas A in the end-to-end antennas of rows $1^{st}$ and $2^{nd}$, except for waste SC that occurs only at the marginal sides of the web AW at every other antenna row.

Figure 15:
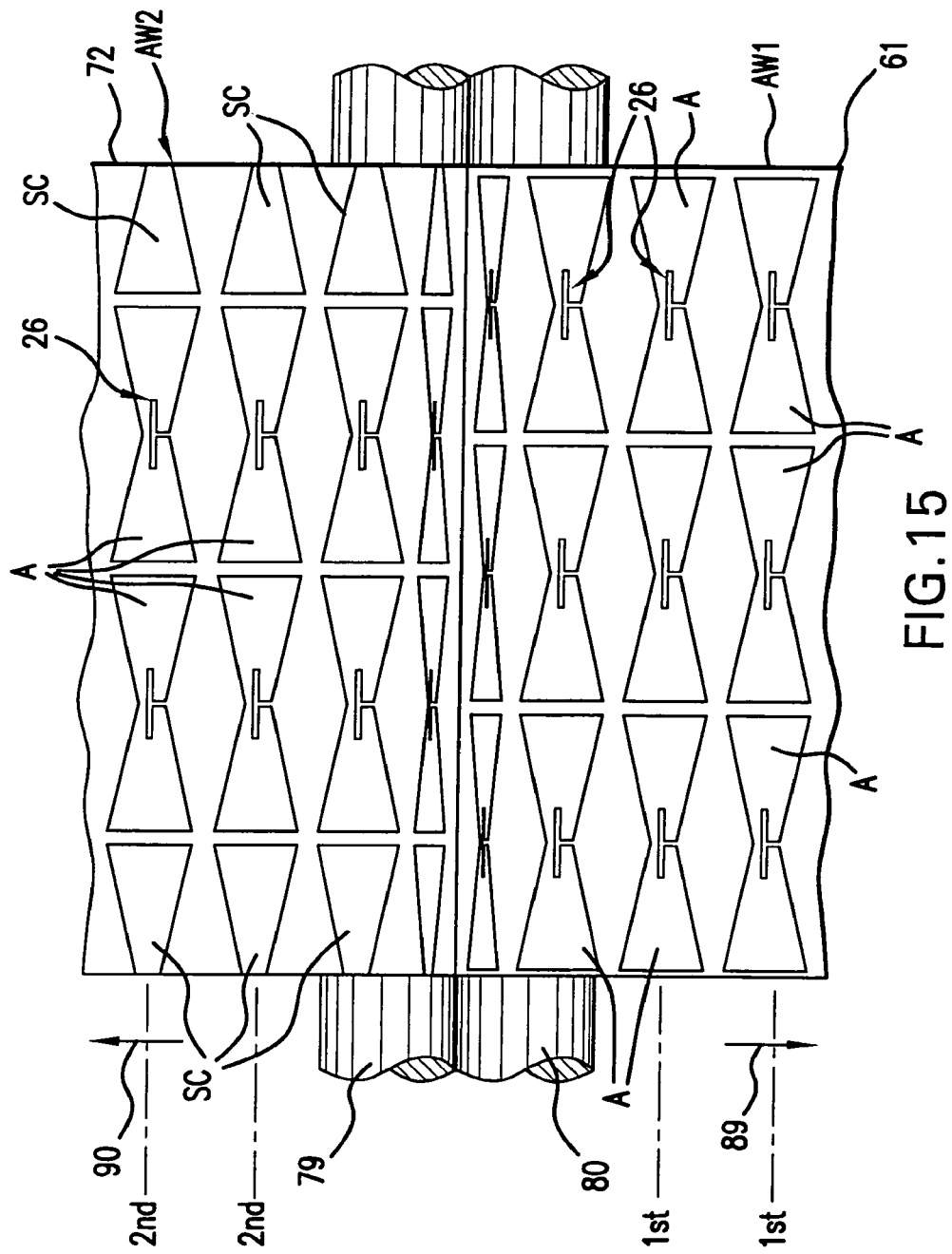
FIG. 15 is a view taken generally along line 15-15 of FIG. 8 showing the first and second carrier webs being separated together with their respective first and second antennas.

With reference to FIGS. 8 and 15, the first antenna web AW1 to which the first antennas A are adhesively adhered passes in the direction of arrow 89 following separation and the second antenna web AW2 to which second antennas A are adhesively adhered passes in the direction of arrow 90 following separation. From there the first web AW1 is rewound into a roll 91 and the second antenna web AW2 is rewound into a roll 92.

As shown in FIG. 16, the first wide antenna web roll AW1 is next slit into three narrow antenna webs 61' using slitter blades 93 from which the one-up or single antenna column wide, narrow antenna webs 61' can be wound into narrow rolls 94, 95 and 96. The side edges of the web 61 can have excess material which can be trimmed, if desired.

With reference to FIG. 17, the second wide antenna web roll AW2 is slit by knife 97 into narrow antenna webs 99 and 100 and trimmed by knives 98 to remove waste or scrap SC, and thereafter wound into narrow antenna web rolls 101 and 102.

Figure 18:
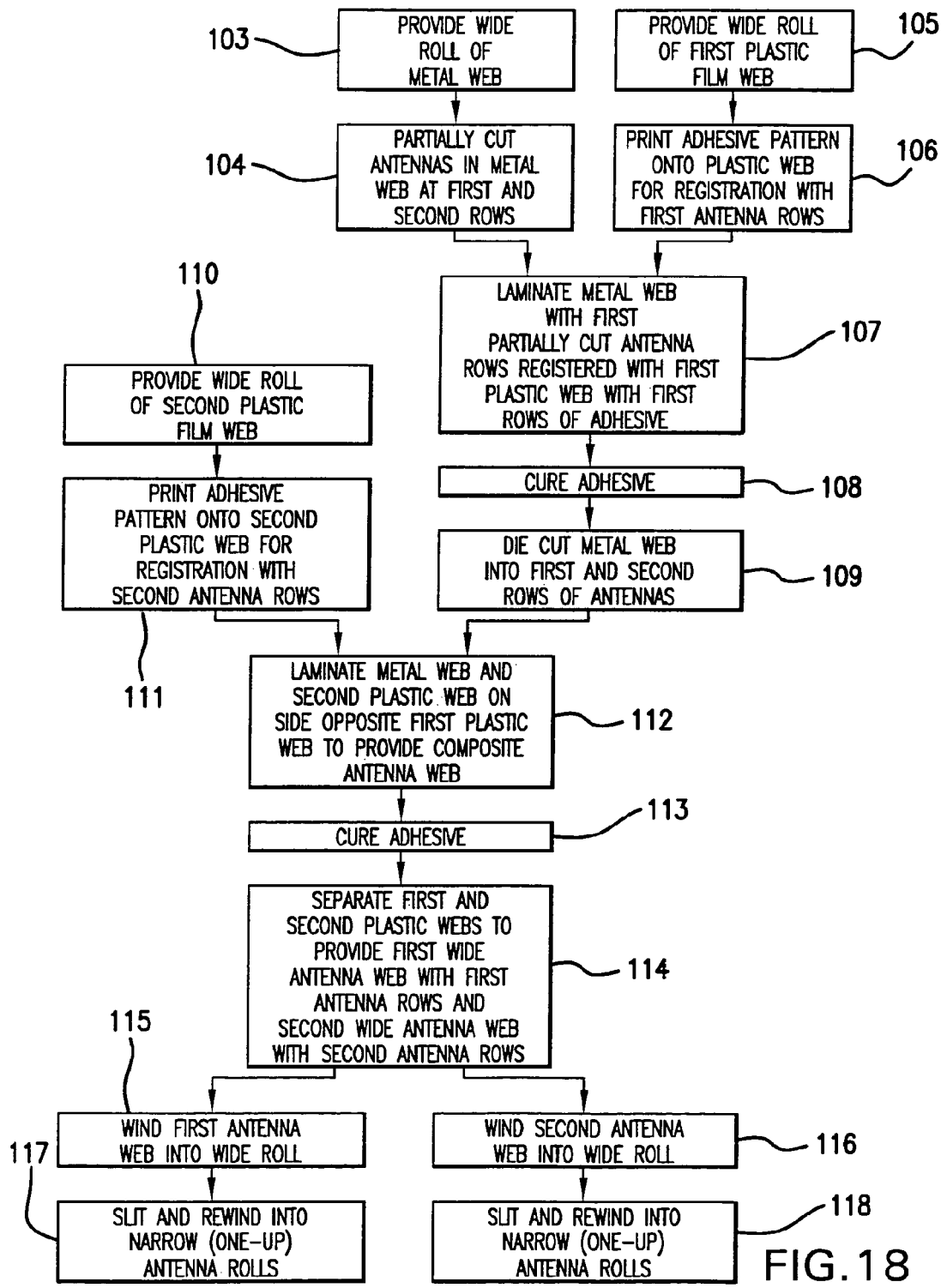
FIG. 18 is a flow chart depicting the method illustrated in FIGS. 8 through 17.

FIG. 18 is a simplified flow chart depicting a method according to the invention of making transponder webs. In block 103, a flexible, conductive metal web is provided as a starting material. Next as shown in block 104, antennas are partially formed by partially cutting the metal web at first and second rows. Also, a wide first plastic film web is provided as another starting material as indicated at block 105. At the same time as the antennas A are partially formed at block 104, an adhesive pattern of adhesive areas 85 in first rows 1st is printed or coated onto the first plastic web 61 for registration with the first antenna rows 1st as indicated at block 106. Next, as depicted at block 107, the metal web 58 with first partially cut antenna rows registered with first rows $1^{st}$ of adhesive A' on the first plastic web 61 and the web 61 are laminated to each other. The preferably UV curable adhesive A' is then cured as depicted at block 108. Thereafter, the metal web 58 is cut into first and second rows of antennas A as depicted at block 109. While the webs 58 and 61 are moving or traveling, a wide roll of a second plastic film 72 provided at block 110 is printed with an adhesive pattern of rows 87 of adhesive A' for registration with second antenna rows $2^{nd}$ as indicated at block 111. Next, the metal web 58 and the second plastic web 72 are laminated on the side of the metal web 58 opposite the first plastic web 61 to provide a composite antenna web AW per block 112. Thereafter, the UV curable adhesive A' on the web 72 is cured as indicated at block 113. Next the first and second plastics webs 58 and 72 are separated to provide a first wide antenna web AW1 with first antenna rows 1st and a second wide antenna web AW2 with second antenna rows 2nd as per block 114. Next the first antenna web AW1 is wound into a wide roll as depicted at block 115 and the second antenna web AW2 is wound with a wide roll as depicted at block 116. Next, the first antenna web AW1 is slit into narrow antenna webs 61' one antenna wide or one-up and rewound into rolls 94, 95 and 96 as shown at block 117, and the second antenna web AW2 is slit into narrow antenna webs 99 and 100 one antenna wide or one-up and rewound into rolls 101 and 102 as shown at block 118. Because the antenna web AW2 contains the scrap SC, it is preferred to trim the web AW2 of the scrap SC using outboard knives 98 as shown in FIG. 17. If desired, after block 114, the first antenna web AW1 and the second antenna web AW2 can be slit and rewound without the steps indicated at blocks 115 and 116.

With reference to FIG. 19, the one-up linered strap web NCSW in a roll R' is paid out and travels over a defective strap detector 119 which attempts to read and/or write to the chip C in each strap S. The strap web NCSW is advanced by feed roller 120 and 121, one of which is motor-driven, and the strap web NCSW passes to a cutter and applicator assembly 122 shown in greater detail in FIG. 20. The assembly 122 includes a block 123 with a knife or cutter element 124 and an applicator 125 in the form of a resilient elastomeric pad 125'. The block 123 is suitably actuated as by a piston/cylinder device, a solenoid, or the like indicated at 126 in FIG. 19. The knife or cutter 124 cooperates with an inclined edge 127 of a knife or cutter blade 128 so that the strap web NCSW is progressively cut laterally as the knives 124 and 128 cooperate. The separated leading strap S is either applied to a heated vacuum drum 129 by the descending action of the applicator 125, or in the case of a defective strap S, the defective strap S is removed by vacuum through a duct 130.

The drum 129 can be considered to be a transfer drum because it transfers a separated strap S to the antenna web AW1 and applies a strap S to an antenna A. The illustrated first antenna web AW1 is paid out of the roll 94 for example and passes partially around a roll 131 and partially around a heated drum 132 which can be a vacuum drum. The drums 129 and 132 rotate at the same peripheral speed and the straps S are applied precisely to the contacts 29 (FIG. 2) to form the transponders T. It is noted that the conductive particle-containing adhesive 40 (FIG. 7) heated by the heated drum 129 is activated. In addition, the heated drum 132 heats the antennas A. When a strap S and an antenna A are between and in pressure contact with the drums 129 and 132 the contacts 37 on the straps are electrically connected to the contacts 29 on the antenna, and the conductive particles 41 help make good contact. The transponder web W thus formed passes to a cooling surface of a cooling drum 133 and from there is rewound into a roll R. It is preferred that while the web W is wound into the roll R, a liner 134 is co-wound so that each wrap of the web W is separated from the adjacent wrap by liner material. The web W can be wound transponder-side-in as shown in FIG. 19 or transponder-side-out as shown in FIG. 1, as desired.

Figure 21:
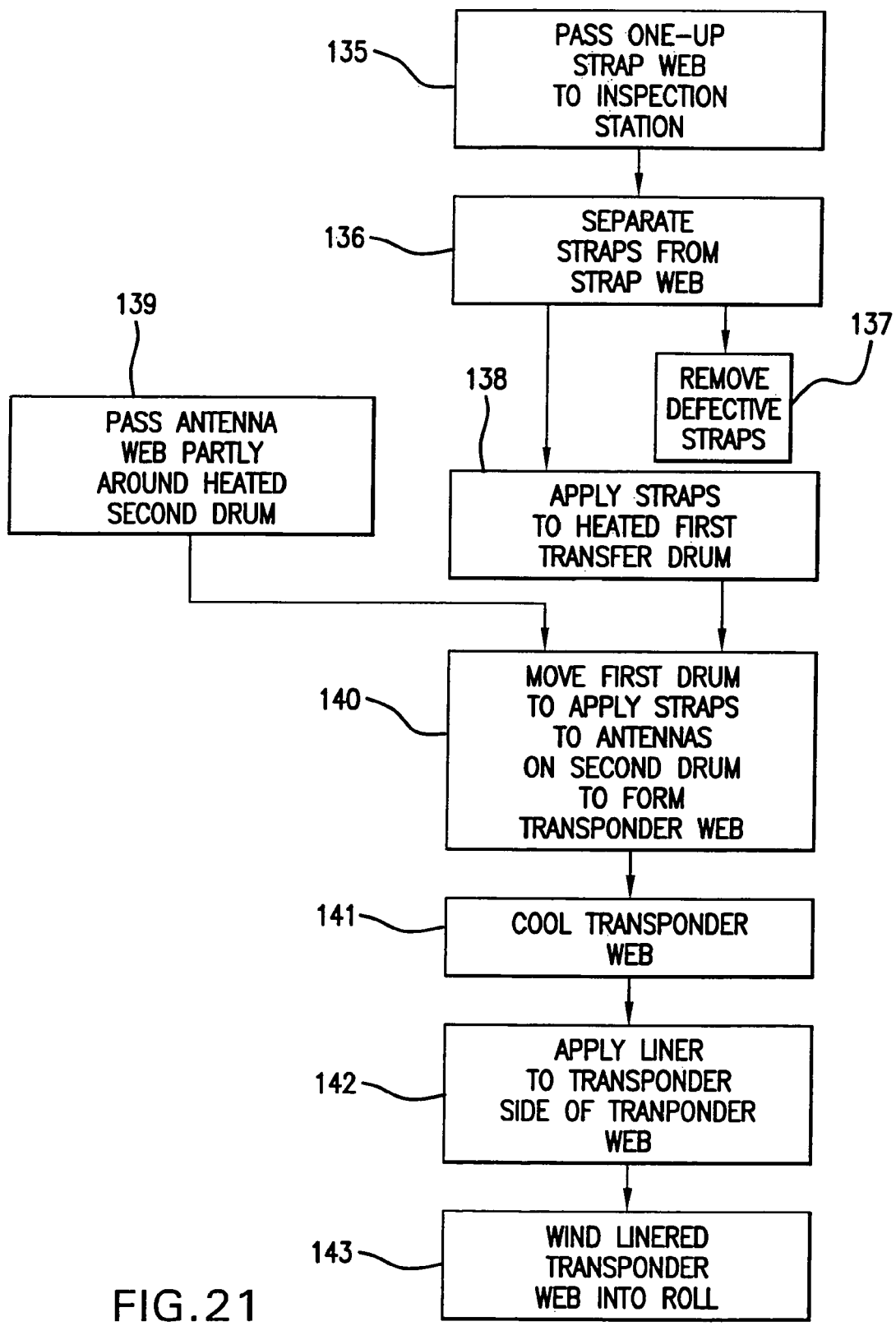
FIG. 21 is flow chart depicting the method of FIG. 19 of the invention.

With reference to FIG. 21, there is shown a simplified flow chart of the method of making a web of transponders depicted in FIGS. 19 and 20. At block 135 a one-up strap web NCSW is passed to an inspection station 119 and at block 136 the leading straps S are separated on-by-one from the strap web NCSW. Defective straps S are removed as they are separated by the knives 124 and 128 through a duct 130 by the assistance of vacuum as indicated at block 137. The remaining straps S are progressively applied to the first heated transfer drum 129 to which they are held as the drum 129 rotates (counterclockwise in FIG. 19) until the leading strap S on the drum 129 is in a position opposed to the drum 132 at which time the vacuum to that strap S is interrupted, as summarized at block 138. While the transfer drum 129 is rotating, antenna web AW1 is passed partly around the heated drum 132 as indicated at block 139. The drum 129 moves to apply straps S to the antennas on the second drum to form a transponder web W as shown at block 140. Next the web W preferably passes partly around a cooling drum to cool the transponder web W as shown at block 141. It is preferred to optionally apply a liner 134 along the entire surface of the transponder web W as indicated at block 142 and to wind the linered transponder web W into a roll R as indicated at block 143.

It should be noted in FIG. 15 in particular that the slots 26 in the antennas A of web AW1 extend in the opposite direction from the slots 26 in the antennas A of web AW2, although the antennas A per se of each web AW1 and AW2 are identical. Accordingly, in the event it is desired to use the antenna web AW2 in the arrangement of FIG. 19, the registration of the straps S and the antenna web AW2 should be adjusted so that the contacts 37 on the straps S meet the contacts 29 on the antennas A. Alternatively, the antenna web AW2 needs to be rewound again before loading it into the position occupied by the roll 94 in FIG. 19 so that the web AW2 can be used the same way the web AW1 is used in FIG. 19.

Figure 22:
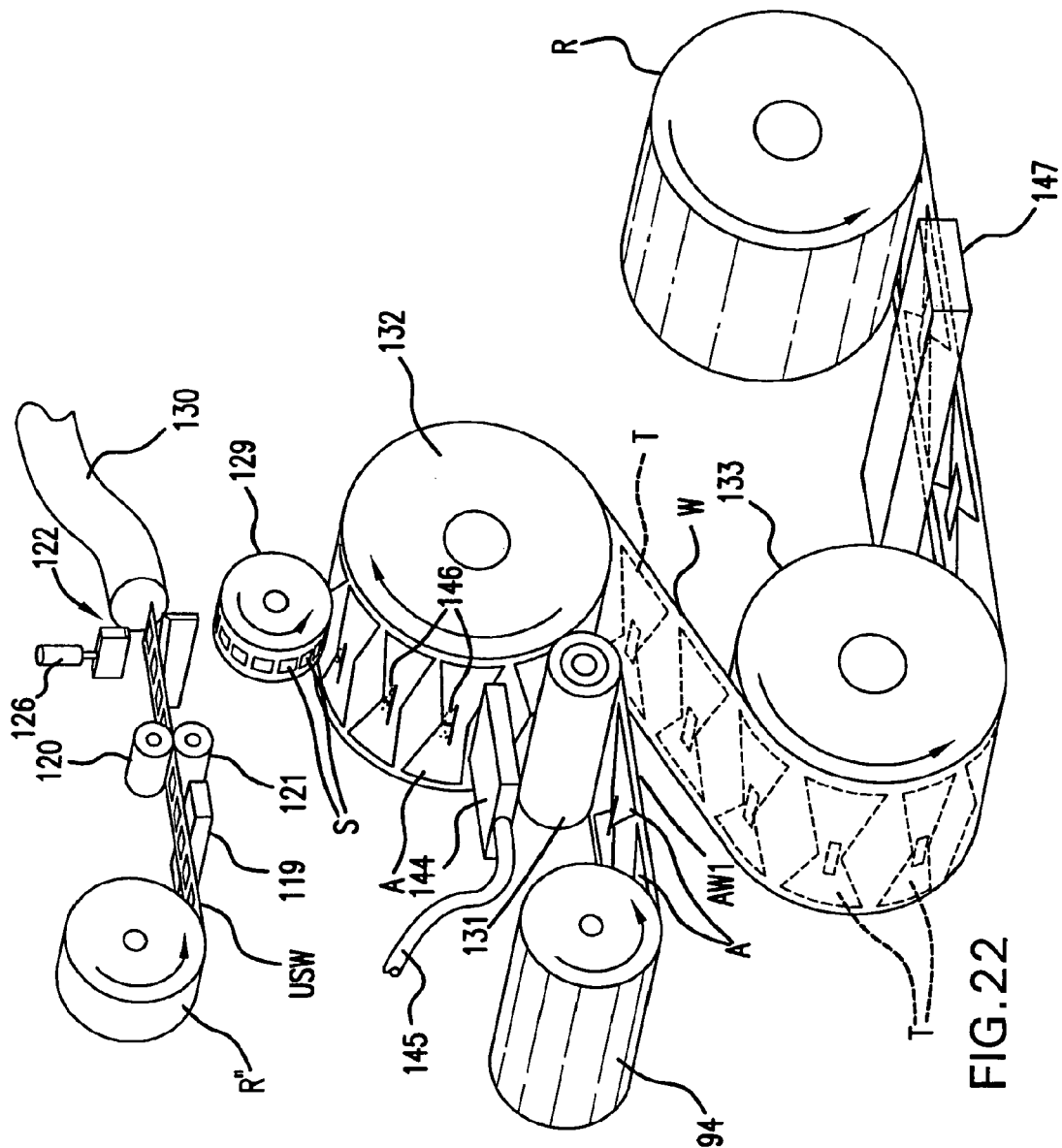
FIG. 22 is a perspective view depicting an alternative method of making an RFID transponder web from webs of RFID straps and antennas.

In the embodiment of FIG. 22 the same reference characters are used to designate identical components having the same construction and function. The differences in the embodiment of FIG. 22 over the embodiment of FIGS. 19 and 20 are as follows in this paragraph: Referring to FIG. 22, roll R" is comprised of a narrow strap web USW which may have been slit from a wide strap web as shown if FIG. 3. The web USW does not have any adhesive coating like the coating of adhesive 40 shown in FIGS. 6 and 7. The strap web USW is feed to the defective strap detector station 119 to the cutting station where the straps S are separated on-by-one from the strap web USW. Defective straps S are removed through the duct 130 and acceptable straps S are transferred to the drum 129. The web AW1 is paid out of roll 94 for example passed partially around the roll 131 and partially around the heated drum 132. An adhesive applicator head 144 supplied with adhesive through a conduit 145 applies an electrically conductive particle-containing, heat softenable and heat curable adhesive 146 to the contacts 29 on the antennas A. When the straps S adhered by vacuum to the transfer drum 129 are applied in registration to the antennas A, the contacts 37 on the straps are electrically connected to the contacts 29 on the antennas A, thereby forming transponders T. The heat from the drum 132 softens and cures the adhesive 146. After the straps S have been connected to the web AW1, the web AW1 becomes a transponder web W which is then passed partially about the cooling surface of the cooling drum 133. The web W is then passed beneath a printing transponder detector 146 which reads and/or writes to each transponder T and prints a mark on or near a defective transponder T. From there, the web W is wound into a roll R.

Figure 23:
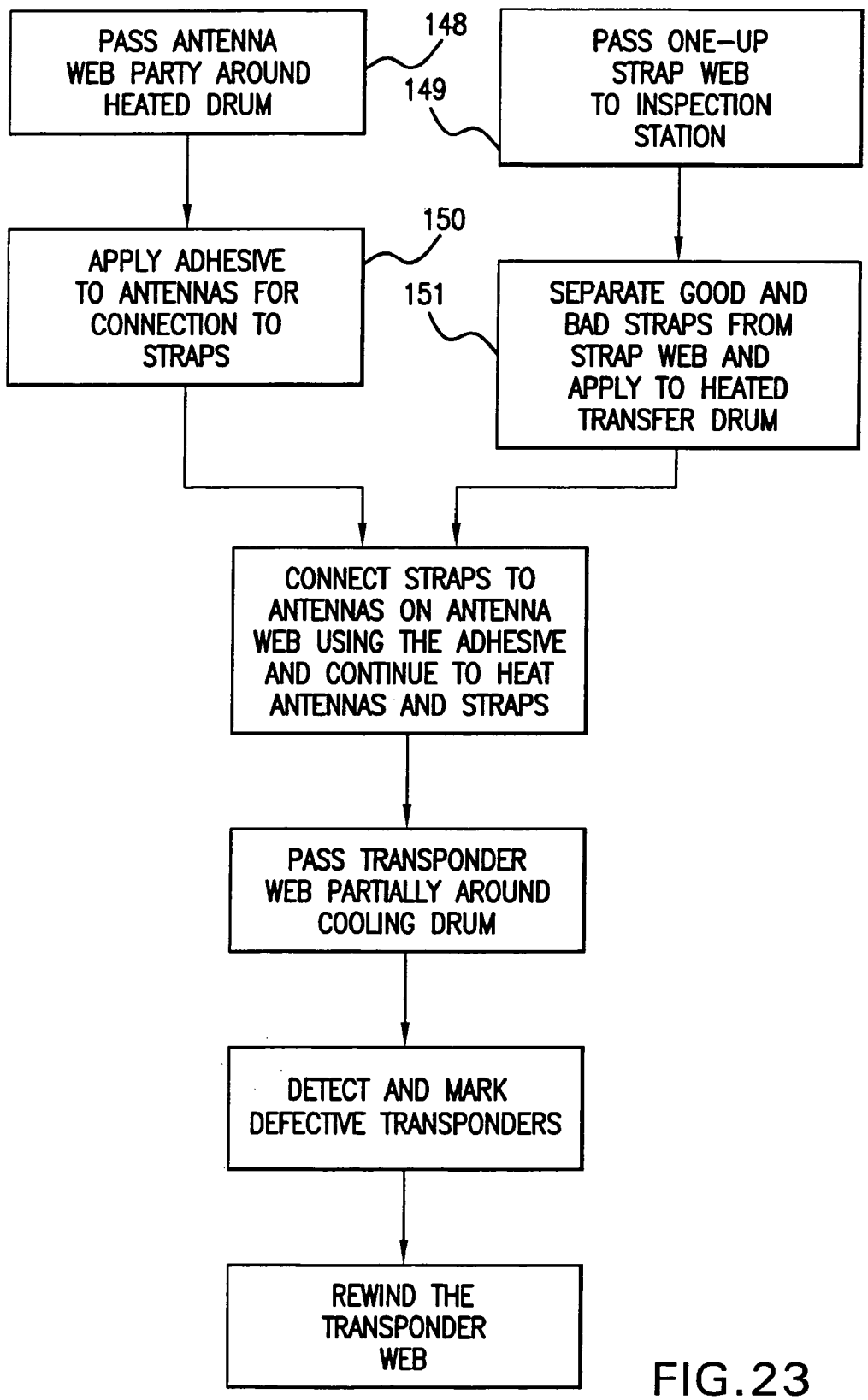
FIG. 23 is a flow chart depicting certain steps of the method illustrated in FIG. 22.

FIG. 23 is a simplified flow chart illustrating mainly the differences in the embodiment of FIG. 22 over the embodiment of FIGS. 19 through 21. As in the embodiment of FIGS. 19 through 21, FIG. 23 shows that antenna web AW1 is passed partly around heated drum 129 at block 148 and an uncoated one-up strap web USW is passed to a defective strap detection station at block 149. Adhesive 146 is applied to the antennas A for connection to the straps S as indicated at block 150. After the good and the bad or defective straps S are separated from the strap web USW and applied to the heated transfer drum 129 as indicated at block 151, the straps S are connected to the antennas A using heat and pressure applied to the conductive adhesive 146 as indicated at block 152. The antennas A and straps S continue to be heated so long as the web W is in contact with the drum 132. From there the web W is passed to a cooling drum 133. From there, all the transponders are tested by writing to and/or reading from each transponder T at a defective transponder detection station 147 as the web W moves, and a mark is printed on the transponder web W at or near the defective transponders T. Next the transponder web W is wound into a roll R.

It is apparent that when registering the various webs 58, 61, 72, NCSW, USW, AW1 and AW2 registration marks can be provided on these webs.

It is apparent that instead of using antenna webs AW1 and AW2 in the methods depicted in FIGS. 19 through 23, the antenna webs can instead be made by other and different methods utilizing printing, etching, deposition, and so on.

By example, not limitation, the wide strap webs WSW are available from Alien Technology Corporation, Morgan Hill, Calif. under Model No. ALC-140-AS, and the overall dimensions of each strap Sx is 3.5 mm by 7 mm by 0.2 mm thick. The plastics film webs 61 and 72 of plastics material are available from Multi-Plastics Corporation, Mount Pleasant, S.C., and are transparent and known in the trade as Mylar preferably of the heat stabilized version known as Type LCF-4000. This plastics film is comprised of clear polyester and has a thickness of 0.05 mm. The conductive metal web 58 is comprised of aluminum having a thickness of 0.012 mm and is 457 mm wide. The adhesive 40 is a product of Forbo Adhesives Corporation, Durham, N.C., a subsidiary of Forbo International S.A, Zurich Switzerland, type Swift heat seal adhesive #82681 mixed with about five percent by weight of Ames Goldsmith Corporation, Glens Falls, N.Y., type LCP15 0.015 mm diameter silver particles. The ultraviolet curable adhesive A' is a product of RAD-CURE Corp., Fairfield, N.J., known under the designation TYPE X 4002138B. The conductive adhesive 146 is a product of Emerson & Cuming Corp., Billericz, Mass., a National Starch & Chemical Company, Bridgewater, N.J., and is sold under the formula XCA-90216.

Figure 24:
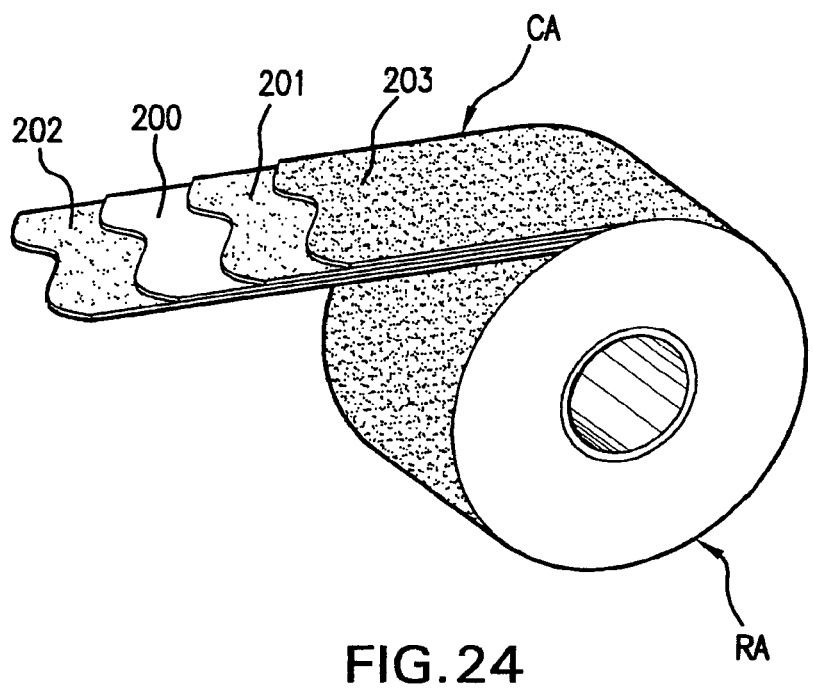
FIG. 24 is a perspective view of a composite adhesive web in accordance with the invention.

With reference to FIG. 24, there is shown a roll RA of a composite adhesive web CA comprised of a carrier web 200 having a release coating 201 on at least a first side and in the event the composite conductive adhesive web CA is to be wound into a roll as shown there is preferably also a release coating 202 on a second side of the carrier web 200. The release coatings 201 and 202 are shown by light stippling in FIG. 24. The release coatings 201 and 202 can be comprised of silicone or any other suitable material such as a wax. A web of electrically conductive adhesive 203 is in contact with the release coating 201 and is shown by heavier stippling in FIGS. 24 through 26. The electrically conductive adhesive web 203 is comprised of a thermoplastic adhesive containing electrically conductive particles described in further detail below.

Figure 25:
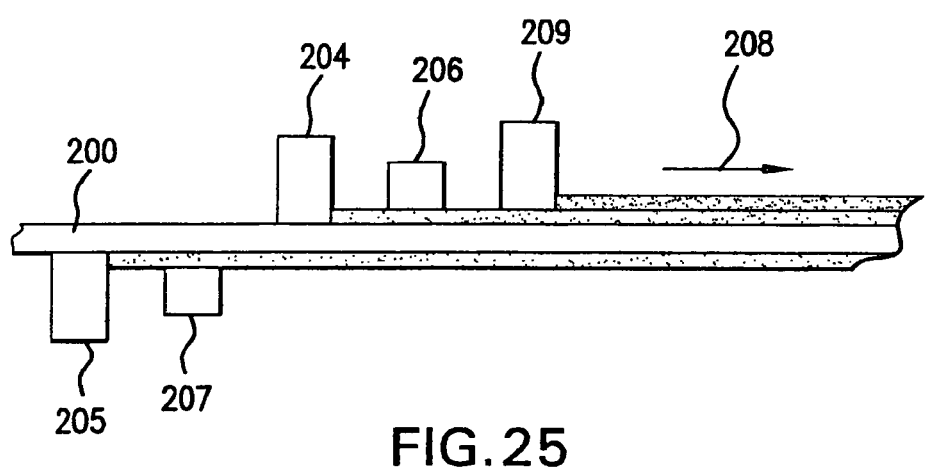
FIG. 25 is a diagrammatic side elevational view illustrating the manufacture of the composite adhesive web shown in FIG. 24.

FIG. 25 illustrates a method of making the composite adhesive web shown in FIG. 24. Coating heads 204 and 205 apply a preferably curable release coating such as silicone to the carrier web 200. Curing of the release coating in the case of silicone occurs at UV heaters 206 and 207. As the release coated web 200 moves in the direction of arrow 208 a coating head 209 applies a coating of the thermoplastic, electrically-conductive particle containing adhesive 203 to the release coating 201 to form the composite electrically conductive adhesive web CA.

Figure 26:
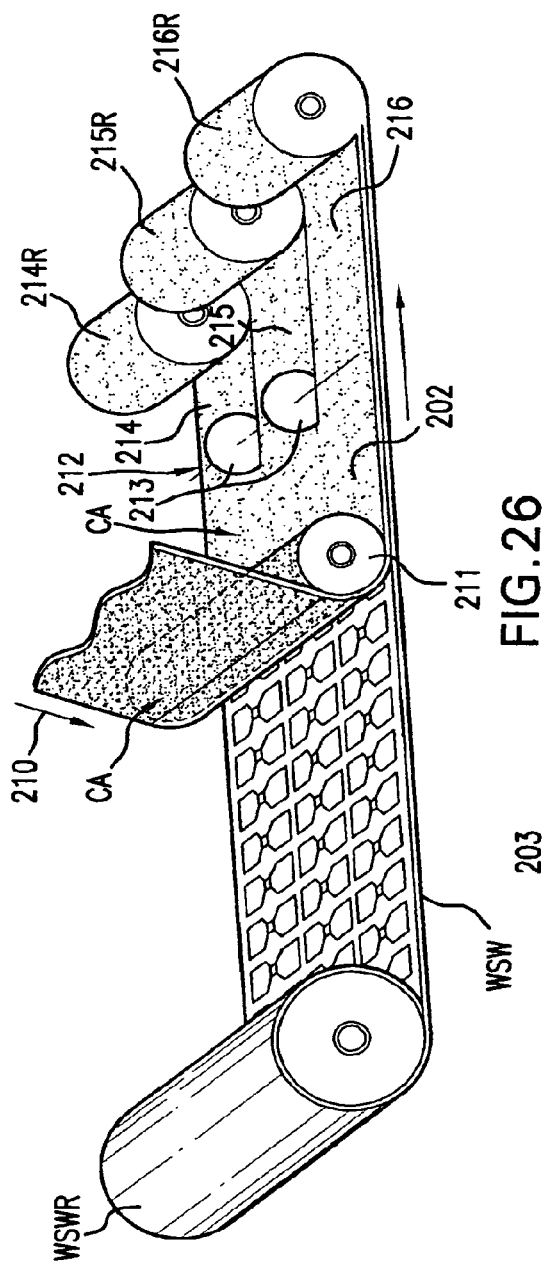
FIG. 26 is a perspective view showing a wide strap web being adhered to the composite adhesive web shown in FIGS. 24 and 25 to provide a wide composite strap web followed by slitting into narrow composite strap webs.

FIG. 26 illustrates a web of RFID straps S, namely, a wide strap web WSW as shown in FIG. 3 in a roll WSWR. The composite conductive adhesive web CA moves in the direction of arrow 210 and is brought together or combined with wide strap web WSW as the web CA passes about roll 211. The roll 211 is preferably a heated roll which causes the thermoplastic adhesive of the conductive adhesive web to adhere to the conductive side of the RFID straps S of the wide strap web WSW. If desired, the roll 211 need not be a heated roll but the thermoplastic adhesive 203 can be heated by a roll (not shown) or other suitable heater downstream of the place where the webs WSW and CA are combined. Therefore, the adhering of the adhesive 203 of the web CA to the web WSW can be where these webs are combined into layers or at difference places. The combined webs WSW and CA form a combined or composite strap web 212 which is considered to be laminated once the adhesive component of the adhesive web 203 has been heated to a temperature sufficient to adhere the adhesive web 203 to the strap web WSW. From there, the composite web 212 can be slit by knives 213 into narrow strap webs 214, 215 and 216 and wound into narrow composite strap web rolls 214R, 215R and 216R. The strap webs 214, 215 and 216 have only one column of straps S, as do the webs NCSW.

Figure 27:
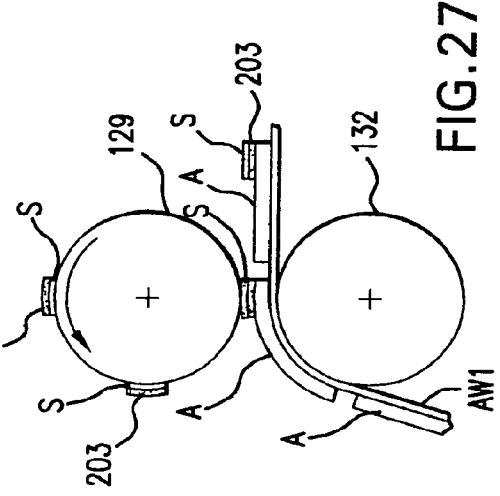
FIG. 27 is a side elevational view illustrating the bonding of straps to antennas on a carrier web.

With reference to FIG. 27, there is shown an arrangement wherein straps S, which were severed from the strap webs 214, 215 and/or 216, are held to the drum 129 as by vacuum and brought into position with antennas A carried on a web AW1 as also illustrated in FIGS. 19 and 20. The drum 129 and a back-up drum 132 are preferably both heated and when the strap S is applied to the antenna A and heated to a temperature preferably higher than the temperature at which the adhesive 203 is adhered to the web WSW and pressure is exerted on the strap S and the underlying adhesive 203 by drums 129 and 132, the electrically conductive particles in the layer of adhesive 203 electrically connect the strap S to the antenna A. The temperature at which the straps S are electrically connected to antennas A is higher than the temperature at which the adhesive web 203 is adhered to the straps S, but not so high as to adversely affect the straps S.

With respect to the embodiment of FIGS. 24 through 27, the wide strap webs WSW are the same as described above, however the conductive adhesive 203 differs from the adhesive 40. By way of example, not limitation, the adhesive in the conductive adhesive 203 is a product of Bostik Findley, Inc. Wauwatosa, Wis., U.S.A. is of a type EVA-based hot melt, thermoplastic adhesive No. H1477 mixed with 15% by weight of Potters Industries, Inc., type SC500P18, 0.035 mm diameter silver coated copper particles.

Other embodiments and modifications of the invention will suggest themselves to those skilled in the art, and all such of these as come within the spirit of this invention are included within its scope as best defined by the appended claims.

What is claimed is:

1. A composite RFID strap web, comprising:
   a wide web of RFID straps in longitudinally extending columns along the wide web and in transversely extending rows across the wide web, and
   a composite adhesive web comprising a flexible carrier web,
   a release coating on the first side of the flexible carrier web,
   a thermoplastic, electrically conductive adhesive releasably adhered to the release coating on the first side, the thermoplastic, electrically conductive adhesive being adhered to all the straps on the wide strap web, and the thermoplastic, electrically conductive adhesive containing electrically conductive particles; and
   wherein the release coating on the first side is between the flexible carrier web and the thermoplastic, electrically conductive adhesive.

2. The composite RFID strap web of claim 1 wherein the adhesive is an anisotropic adhesive.

3. The composite RFID strap web of claim 1 wherein the adhesive is a patterned adhesive.

4. The composite RFID strap web of claim 1 wherein the adhesive covers the entire strap web.

5. A composite RFID strap web, comprising:
   a web of RFID straps having a single longitudinally column of straps, and an adhesive web comprising a flexible carrier web,
   a release coating on the first side of the flexible carrier web, and
   a thermoplastic, electrically conductive adhesive releasably adhered to the release coating on the first side, the thermoplastic, electrically conductive adhesive being adhered to all the straps on the strap web, and the thermoplastic, electrically conductive adhesive containing electrically conductive particles; and
   wherein the release coating on the first side is between the flexible carrier web and the thermoplastic, electrically conductive adhesive.

6. The composite RFID strap web of claim 5 wherein the adhesive is an anisotropic adhesive.

7. The composite RFID strap web of claim 5 wherein the adhesive is a patterned adhesive.

8. The composite RFID strap web of claim 5 wherein the adhesive covers the entire strap web.

* * * * *